UNITED STATES PATENT OFFICE.

JACOB B. SLICHTER, OF CHICAGO, ILLINOIS.

IMPROVEMENT IN FIRE-PROOF ROOFING-CEMENTS.

Specification forming part of Letters Patent No. 142,130, dated August 26, 1873; application filed June 24, 1873.

*To all whom it may concern:*

Be it known that I, JACOB B. SLICHTER, of Chicago, in the county of Cook and State of Illinois, have invented a new and useful Improvement in Fire-Proof Roofing-Cement; and I do hereby declare the following to be a full, clear, and exact description thereof, which will enable others skilled in the art to which my invention appertains to compound and use the same.

My invention relates to that class of cements which are applied to the upper surface of a layer of felting, and has for its object to render the same fire-proof as well as water-tight; and to that end it consists in a composition composed of asphaltum, residuum-oil, water-glass, oxide of iron, and ground soap-stone, which, when formed of the proportions and compounded in the manner stated, forms a cement which, when applied to the felting, renders the same water and fire proof, without injuring its flexibility.

In manufacturing my said cement I first take one hundred (100) pounds of Trinidad asphaltum and six (6) gallons of residuum-oil, which are placed in any suitable vessel. These ingredients are then subjected to the required heat to form a liquid, and while hot I add nine (9) gallons water-glass, forty-five (45) pounds of oxide of iron, and forty (40) pounds of ground soap-stone, all of which are allowed to remain hot until thoroughly united. The cement is then ready for use, and is applied to the felting while hot, and after the latter has been secured upon the roof.

This cement forms an elastic coating upon the felting, which has been found by practical experience and use to be most serviceable and durable, it being neither affected by heat or cold, nor liable to crack.

Having thus described my invention, I claim—

The fire-proof roofing-cement composed of the ingredients specified, and mixed in or about the proportions as described.

The above specification of my invention signed by me this 21st day of June, 1873.

J. B. SLICHTER.

Witnesses:
 N. H. SHERBURNE,
 C. W. SMITH.